United States Patent [19]

MacDonald

[11] Patent Number: 5,340,018

[45] Date of Patent: Aug. 23, 1994

[54] THERMOSTATICALLY CONTROLLED MIXING VALVE

[75] Inventor: Robert MacDonald, Scottsdale, Ariz.

[73] Assignee: Masco Corporation of Indiana, Greenburg, Ind.

[21] Appl. No.: 107,429

[22] Filed: Aug. 17, 1993

Related U.S. Application Data

[63] Continuation of Ser. No. 669,697, Mar. 14, 1991, abandoned.

[51] Int. Cl.⁵ ............................................. G05D 23/13
[52] U.S. Cl. .................................................. 236/12.2
[58] Field of Search .................. 236/12.18, 12.19, 12.2

[56] References Cited

U.S. PATENT DOCUMENTS

| | | | |
|---|---|---|---|
| 2,657,860 | 11/1953 | Schmidt et al. | 236/DIG. 5 |
| 3,241,566 | 3/1966 | Roman | 137/100 |
| 3,605,784 | 12/1969 | Bowman | 137/100 |
| 3,645,493 | 2/1972 | Manoogian et al. | 251/120 |
| 3,674,048 | 7/1972 | Manoogian et al. | 137/270 |
| 3,685,728 | 8/1972 | Chapou | 236/12.2 |
| 3,792,812 | 2/1974 | Knapp | 236/12.2 |
| 3,827,016 | 7/1974 | Knapp | 236/12.2 |
| 3,929,283 | 12/1975 | Delpla | 236/12.2 |
| 3,955,759 | 5/1976 | Knapp | 236/12.2 |
| 4,095,610 | 6/1978 | Priesmeyer | 137/100 |
| 4,243,063 | 1/1981 | Parkison | 137/100 |
| 4,423,752 | 1/1984 | Psarouthakis | 137/625.41 |
| 4,669,653 | 6/1987 | Avelöv | 236/12.13 |
| 4,696,322 | 9/1987 | Knapp et al. | 137/218 |
| 4,699,172 | 10/1987 | MacDonald | 137/551 |
| 4,700,928 | 10/1987 | Marty | 251/310 |
| 4,901,749 | 2/1990 | Hutto | 137/270 |
| 4,905,732 | 3/1990 | Bright et al. | 137/605 |
| 4,915,295 | 4/1990 | Pullen et al. | 236/12.16 |
| 4,978,059 | 12/1990 | Nicklas et al. | 236/12.17 |
| 4,979,530 | 12/1990 | Breda | 137/100 |
| 4,981,156 | 1/1991 | Nicklas et al. | 137/270 |
| 5,040,566 | 8/1991 | Orlandi | 137/625.41 |
| 5,067,513 | 11/1991 | Nicklas et al. | 137/98 |
| 5,129,576 | 7/1992 | Pullen et al. | 236/12.2 |

FOREIGN PATENT DOCUMENTS

| | | |
|---|---|---|
| 242675 | 4/1987 | European Pat. Off. . |
| 2804755 | 8/1979 | Fed. Rep. of Germany . |
| 3500461 | 9/1986 | Fed. Rep. of Germany . |
| 2240395 | 8/1973 | France . |
| 6483490 | 3/1985 | Switzerland . |
| 1460983 | 1/1977 | United Kingdom . |
| 2036261 | 2/1979 | United Kingdom . |
| 2139324 | 3/1984 | United Kingdom . |
| 2213566 | 6/1989 | United Kingdom . |

Primary Examiner—William E. Tapolcai
Attorney, Agent, or Firm—Myron B. Kapustij; Malcolm Sutherland

[57] ABSTRACT

A mixing valve having a modular cartridge containing a volume control valve and a thermostatic valve. The cartridge comprises a tubular sleeve having rotatably disposed therein a hollow cylindrical housing containing a valve plate mounted on its bottom end. The valve plate cooperates with a fixed valve plate in a nose piece of the cartridge to control the volumetric flow of water into the cartridge. An inner housing is disposed within the hollow cylindrical housing and defines therewith cold and hot water inlet passageways which are in communication with a mixing chamber in the interior of the inner housing via cold and hot water supply openings. The thermostatic control valve includes a temperature responsive element disposed in the mixing chamber which is operably connected to a piston which is axially slidably movable in a cylinder. The cylinder is fixedly mounted on the top of the inner housing with the bottom of the cylinder and the top of the inner housing defining the hot water supply opening and the top of the cylinder defining with an inner shoulder in the cylindrical housing the cold water supply opening. Upward movement of the piston serves to close off the cold water supply opening while downward movement of the piston serves to close off the hot water supply opening.

27 Claims, 7 Drawing Sheets

THERMOSTATICALLY CONTROLLED MIXING VALVE

This is a continuation of copending application Ser. No. 07/669,697 filed on Mar. 14, 1991, now abandoned.

FIELD OF THE INVENTION

This invention relates to thermostatically controlled mixing valves and in particular to single handle thermostatically controlled mixing valves for providing a stream of water of a substantially constant controlled and preselected temperature from separate hot and cold water streams. Such valves are particularly useful for showers where the temperature of the emitted stream of water, after it has been set, may vary due to demands made upon the cold or hot water supply system elsewhere.

BACKGROUND OF THE INVENTION

Single handle mixing valves are well known and common in the plumbing field. These valves provide a stream of mixed water from separate hot and cold water streams. However, these valves are subject to the inconvenience that may result from a sudden undesirable change in water temperature or pressure of the water in either of the lines supplying water to the valve. In some cases, the resulting change in the temperature of the mixed outlet water can result in discomfort to the user of the valve. The discomfort can be particularly pronounced when the valve is a shower mixing valve and the user is within the shower stall. A sudden pressure drop in the cold water line, such as that which frequently occurs when a toilet is flushed, will cause a sudden increase in the temperature of the shower water, requiring the user to move quickly away from the stream of water.

Several faucets and mixing valves have been developed in an attempt to reduce or eliminate this problem. U.S. Pat. No. 4,699,172 provides a self-regulating valve assembly for combining pressurized hot and cold water to produce an output of mixed water having a preselected constant water temperature. The valve assembly comprises a housing having a valving cavity, a hot water inlet leading to the valving cavity, a cold water inlet leading to the valving cavity, and a mixed water outlet passageway leading from the valving cavity. A valve member translates in the valving cavity and divides the cavity into two auxiliary chambers. A passageway through the valve member allows fluid to flow from each of the inlets to the outlet passageway at a rate that varies as the valve member translates. Passageways in the valve member permit a portion of the mixed water to flow into the auxiliary chambers. An auxiliary passageway is provided between each of the auxiliary chambers and the outlet passageway. A temperature responsive element is provided within the outlet passageway. In response to a deviation in the temperature of water in the mixing chamber the temperature responsive element closes one of the auxiliary passageways causing the valve member to translate until the water in the outlet passageway reaches the preselected temperature.

U.S. Pat. No. 4,901,750 discloses a pressure balanced, volume controlled and temperature controlled mixing valve. This mixing valve has a modular cartridge rotatably mounted in the housing. The cartridge has a bottom volume control valve plate attached to a lower section housing a pressure balance valve. The lower section is secured to an upper section that rotatably receives temperature control plates. The plates are both rotatable about a common axis. One plate is controlled by operation of a first stem attached to a handle. The other plate is controlled by a second stem which is operated by a temperature control knob. An insert allows the temperature control knob to operate even when hot and cold water supplies are inverted. A splined hot water stop ring sits in the handle and adaptably limits rotation of the temperature control knob for a selected maximum water temperature. Outer seals assure that all water flows through the cartridge when the volume is set for partial flow.

U.S. Pat. No. 3,713,301 discloses a valve construction having a hot water inlet connected with the mixing chamber, a cold water inlet connected with the mixing chamber, and a water discharge outlet from said mixing chamber. One or more valve seats are provided in one or more of the inlets. One or more diaphragms are provided in modulating relationship with one or more of said valve seats. Each diaphragm construction includes a pilot passageway and bleed opening and an adjustable pilot in modulating relationship with the valve seat. A thermostat construction is responsive to the mixed water temperature of the mixing chamber and has adjusting means to adjust one or more pilots in modulating relationship to the water passageways in the one or more diaphragms. The thermostat construction may adjust the hot and/or cold water pilot to introduce a proper amount of hot and/or cold water into the mixing chamber. The pilot or pilots may be encased in a cavity wall construction which provides a cavity on one side of the diaphragm. One or more levers are provided with inner ends in the cavities and with sealing outward connections, so that their outer ends may be actuated by the thermostat construction to provide the modulating water control for the hot and/or cold water.

U.S. Pat. No. 3,550,901 discloses a valve construction having a hot water inlet connected with a mixing chamber, a cold water inlet connected with the mixing chamber, and a water discharge outlet from said mixing chamber. One or more valve seats are provided in one or more of the inlets. One or more diaphragms are provided in modulating relationship with one or more of said valve seats. Each diaphragm construction includes a pilot passageway and bleed opening and an adjustable pilot in modulating relationship with the valve seat. A thermostat construction is responsive to the mixed water temperature of the mixing chamber and has adjusting means to adjust one or more pilots in modulating relationship to the water passageways in the one or more diaphragms. The thermostat construction may adjust the hot and/or cold water pilot to introduce a proper amount of hot and/or cold water into the mixing chamber. The pilot or pilots may be encased in a cavity wall construction which provides a cavity on one side of the diaphragm. One or more levers are provided with inner ends in the cavities and with sealing outward connections, so that their outer ends may be actuated by the thermostat construction to provide the modulating water control for the hot and/or cold water.

U.S. Pat. No. 3,388,861 discloses a mixing valve comprising a valve body with hot and cold water inlet ports and an outlet port, an inner member sliding in the valve body and having hot and cold water inlet port means and outlet port means and an adjustment member slidable within the control valve under the actuation of a thermostat element to control the amount of water passing respectively through the hot and cold water inlet port means.

U.S. Pat. No. 3,004,710 discloses an adjustable thermostatic mixing valve having a valve body with hot and cold water inlets leading thereinto, with an outlet leading therefrom. The outlet is provided with an electrically controlled shut-off valve.

One feature of the present invention is that it provides a reliable compact thermostatically controlled valve wherein all the valving elements and temperature sensing elements are provided within a replaceable, easily removable cartridge assembly. An advantage of this configuration is that the cartridge may be retrofitted to existing single handle faucet sockets.

Another feature of the present invention is that the thermostatic valve is not affected directly by changes in pressure in either of the water supply lines, but instead is affected only by the temperature of the mixed water. The advantage to this design is that the valve will produce a more nearly isothermal output than previous valves.

SUMMARY OF THE INVENTION

In accordance with the present invention the thermostatically controlled mixing valve for fluids includes a housing having a cavity which receives a cartridge. The housing is rotatably mounted on a valve socket body having a cold water supply port, a hot water supply port, and a mixed water outlet port. The cartridge comprises a tubular sleeve which receives a hollow cylindrical housing rotatably disposed within the sleeve. A nose piece sized to fit within the valve socket body and having a hot water inlet passageway, a cold water inlet passageway, and mixed water outlet passageway is fixedly attached against rotational movement to the bottom of the tubular sleeve. The nose piece is inserted into the valve socket body so that the cold water inlet passageway communicates with cold water inlet port, hot water passageway communicates with hot water inlet port, and mixed water outlet passageway communicates with mixed water outlet port. A valve plate is fixedly mounted against rotational movement on the nose piece. A volume control valve plate is affixed against rotation to the bottom of the hollow cylindrical housing and cooperates with the fixed valve plate in the nose piece to regulate the volume of water flowing into the cartridge.

An inner housing having a side wall, a bottom wall and an open top is fixedly disposed within the hollow cylindrical housing and defines, together with the hollow cylindrical housing, a longitudinally extending hot water passageway and a circumferentially spaced, longitudinally extending cold water passageway. The side wall and bottom wall of the inner housing define a mixing chamber within the inner housing. A hot water supply opening is provided adjacent the top of the inner housing which is in communication at one end thereof with the hot water passageway and at the other end with the mixing chamber, a cold water supply opening which is circumferentially spaced from the hot water supply opening is also provided adjacent the top of the inner housing and is in communication at one end with the cold water passageway and at the other end with the mixing chamber. A mixed water outlet opening is provided in the bottom wall of the inner housing and communicates with the mixed water outlet passageway in the nose piece through mixed water outlet ports in the fixed valve plate and the volume control valve plate.

A thermostatic element, responsive to the temperature of the mixed water in the mixing chamber, is longitudinally movably disposed in the mixing chamber. The thermostatic element is operably connected to valve means adapted to regulate the flow of water into the mixing chamber through the hot and cold water supply openings. The valve means comprise a cylinder fixedly mounted on the top of the inner housing and a piston axially slidably disposed within said cylinder. The bottom of the cylinder and the top of the inner housing define the hot water supply opening, while the top of the cylinder and an inner shoulder in the cylindrical housing define the hot water supply opening.

The thermostatic element is adapted to move axially in the mixing chamber in response to the temperature of the mixed water in the mixing chamber. An increase in the mixed water temperature results in the thermostatic element moving downwardly in the mixing chamber. This downward movement of the thermostatic element causes the piston, to which the thermostatic element is operably connected, to move downwardly in the cylinder, thereby narrowing or closing the hot water supply opening and reducing the flow of hot water into the mixing chamber. A decrease in the mixed water temperature results in the thermostatic element moving upwardly in the mixing chamber. Upward movement of the thermostatic element causes upward movement of the piston in the cylinder, thereby narrowing or closing the cold water supply opening and reducing the flow of cold water into the mixing chamber.

DETAILED DESCRIPTION OF THE PREFERRED EMBODIMENT

Figure 1:
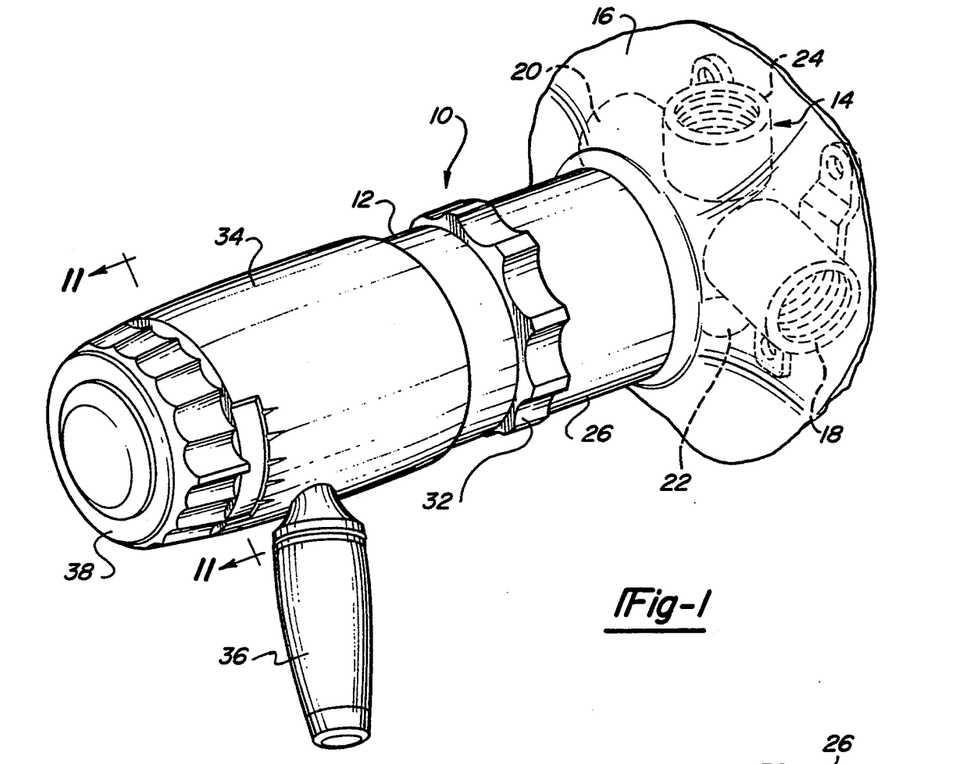
FIG. 1 is a perspective view of a mixing valve assembly according to the invention.
Figures 6, 9, 10:
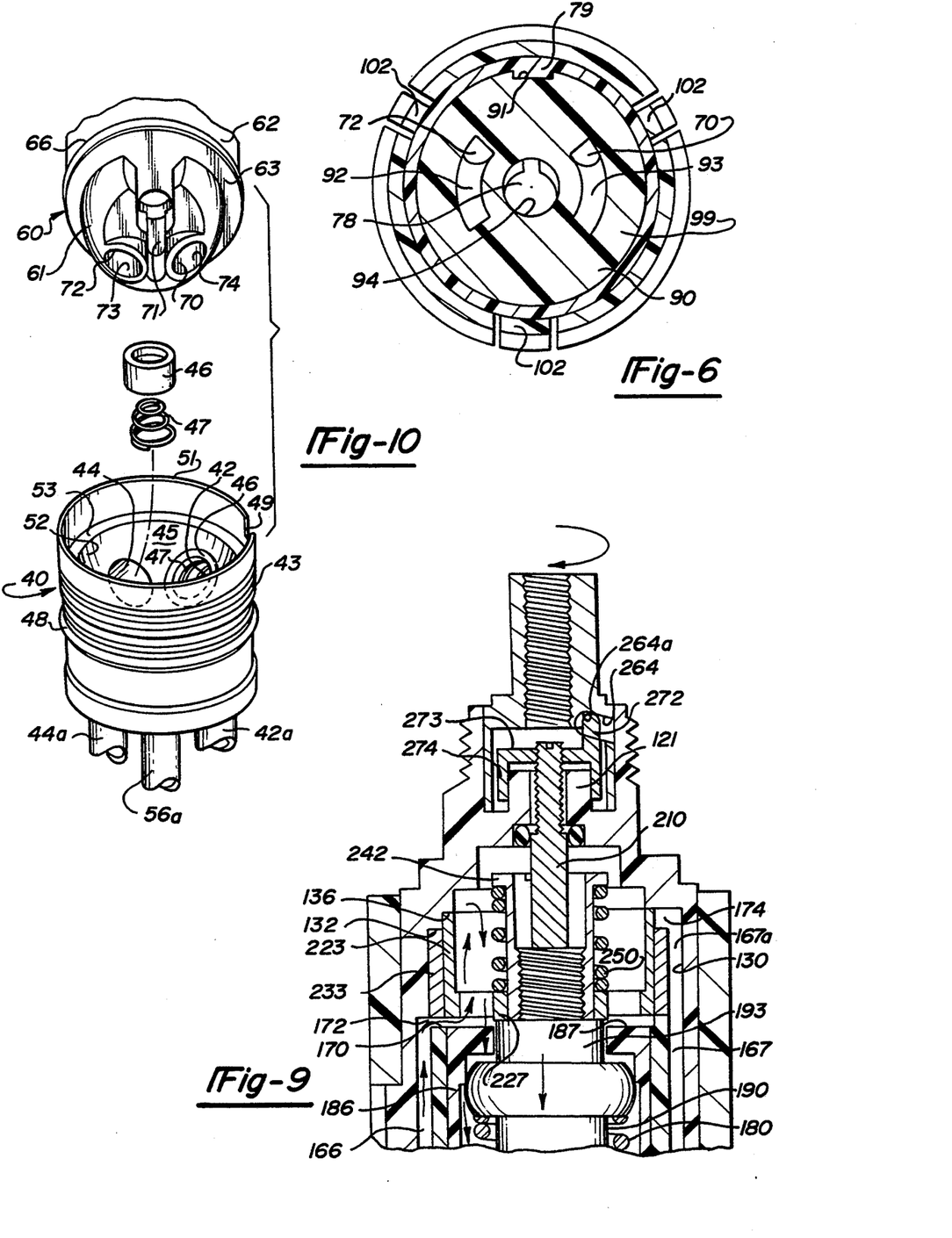
FIG. 6 is a cross-sectional view taken along lines 6—6 in FIG. 4.
FIG. 9 is a view similar to FIG. 7 except that it illustrates the piston in a full up position allowing the flow of only hot water into the mixing chamber.
FIG. 10 is an exploded bottom perspective view of the bottom portion of the cartridge assembly and the valve socket body.

Referring now to FIGS. 1 and 10, mixing valve 10 has a valve socket body 40 connected to a fitting 14 which is usually mounted behind a shower wall 16. The fitting 14 has a cold water supply nipple 18 and a hot water supply nipple 20, and an outlet nipple 22 leading to a tub spout (not shown) and outlet nipple 24 connected to a shower riser (not shown). Outlet nipple 24 is in fluid communication with outlet nipple 22. The valve socket body 40 has a cosmetic collar 26 mounted thereon via a friction sealing ring 48 that is fitted in a groove in valve socket body 40. A collar 32 threadably engages the valve socket body 40 at externally threaded portion 43 thereof. A volume control handle 34 having a lever 36 is rotatable about a central longitudinal axis of valve socket body 40. Temperature control knob 38 is also rotatably mounted at the outer distal end of the volume control handle 34 and is rotatable about the same longitudinal axis of valve socket body 40.

The internal valving is more clearly shown in FIGS. 3-10. For simplicity of reference, the temperature control knob 38 is described as being located at the top of the mixing valve 10. All reference to top, bottom, upper and lower is made with respect and relative to the temperature control knob 38 being located at the top of the mixing valve 10 even though it is perfectly acceptable to mount the mixing valve in other orientations as, for example, illustrated in FIG. 1. The valve socket body 40 is generally of a type well known in the art and is described, inter alia, in U.S. Pat. Nos. 3,050,418; 4,699,172 and 4,901,750, all of which are incorporated herein by reference. The valve socket body 40 is usually metallic and is provided with a cylindrical portion 51 and a hemispherical portion 52. The cylindrical portion 51 and the hemispherical portion 52 define a socket cavity 45. The socket cavity 45 has a hemispherical portion defined by the hemispherical portion 52 of socket body 40 and a cylindrical portion defined by the cylindrical portion 51 of the socket body. The cylindrical portion 51 of valve socket body 40 has a larger internal diameter than the hemispherical portion 52 thereby defining a shoulder 53 therebetween. The hemispherical portion 52 has water supply ports 42 and 44 positioned adjacent the bottom thereof as illustrated in FIG. 10. Supply port 42 is in communication at one end thereof, via supply pipe 42a, with a water supply through nipple 18, and at the other end with cavity 45. Supply port 44 is in communication at one end thereof via supply pipe 44a with a water supply through nipple 20, and at the other end with cavity 45. Valve seats 46, generally made of an elastomeric material such as rubber, etc., are placed in the two ports 42 and 44 to form a watertight seal between the socket body 40 and the nose piece 60 and are urged upwardly by springs 47. A mixed water discharge port 56 (not shown) also extends through hemispherical portion 52 adjacent the bottom thereof and is in communication at one end thereof with the two outlet nipples 22 and 24 via discharge pipe 56a, and at the other end with cavity 45. A keyway 49 is provided in the side wall of the cylindrical portion 51 for engagement with a key 64 of nose piece 60 as described hereinafter.

Nose piece 60 is sized to fit within the socket cavity 45 of the socket body 40. The nose piece 60 may be formed of plastic or any other suitable material. The nose piece 60 has a generally hemispherical portion 61 sized to fit within the hemispherical portion of the valve socket cavity 45, and an enlarged cylindrical portion 62 sized to fit within the cylindrical portion of the socket cavity 45. The cylindrical portion 62 of nose piece 60 has a larger external diameter than hemispherical portion 61 thereby defining a shoulder 63 therebetween. Shoulder 63 is located spatially above the shoulder 53 of the socket body 40 so that the hemispherical portion 61 will rest securely against seats 46. An O-ring 66 is provided in an annular groove 65 extending around the exterior of cylindrical portion 62 of the nose piece 60 to form an additional watertight seal between the socket body 40 and nose piece 60.

Figure 5:
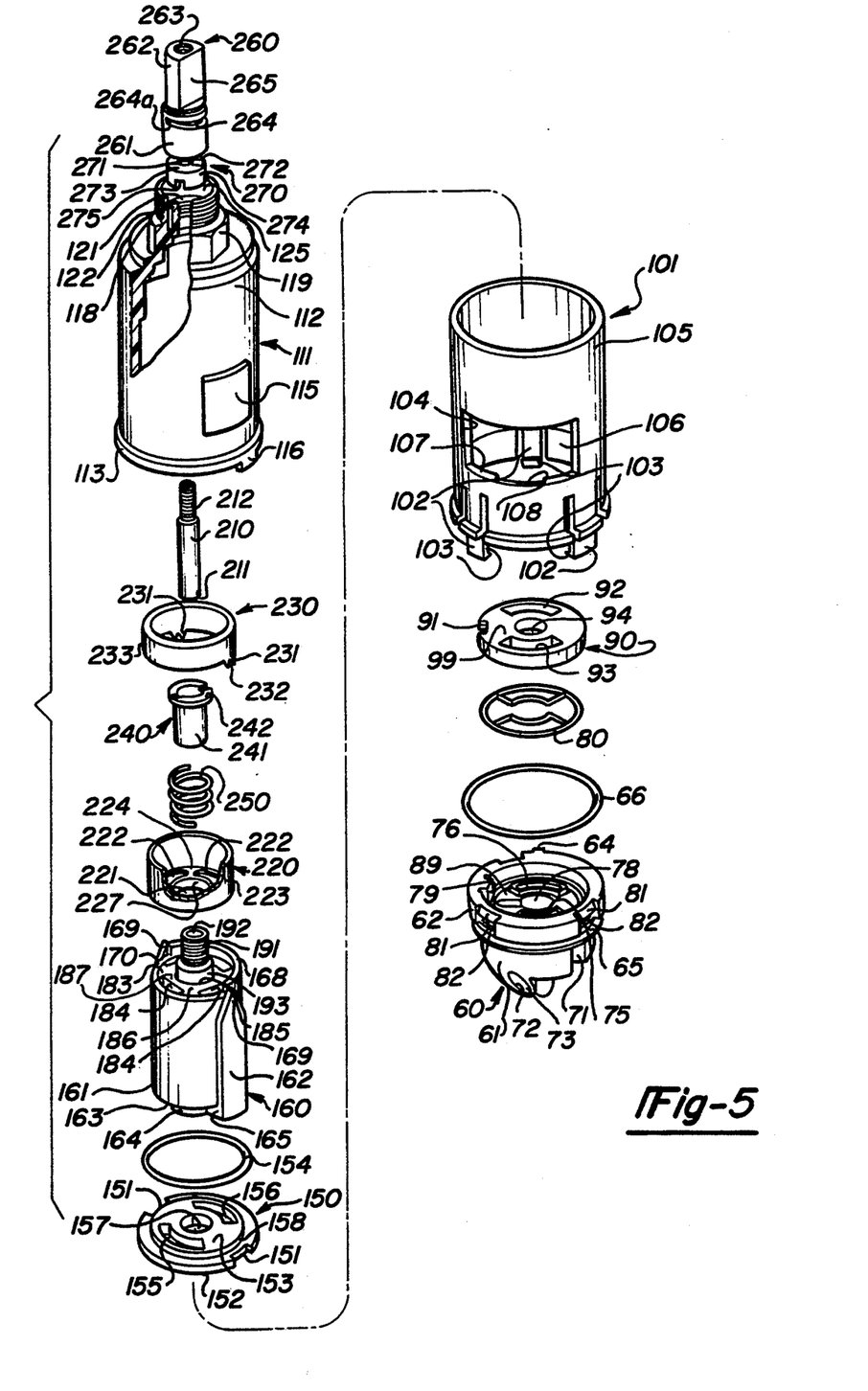
FIG. 5 is an exploded perspective and partially segmented view of the cartridge assembly shown in FIG. 3.

As shown in FIG. 5, a key 64 extends radially outwardly from cylindrical portion 62 of nose piece 60. Key 64 fits into and engages keyway 49 in the side wall of cylindrical portion 51 of socket body 40, thereby preventing rotational movement of nose piece 60 within socket cavity 45.

Three vertical water passageways 70, 71 and 72 are provided through the nose piece 60 from the surface of the hemispherical portion 61 to a recessed flat top surface 67 of the cylindrical portion 62. As best seen in FIG. 10, one of the passageways, the mixed water outlet passageway 71, is defined by a relieved section in the hemispherical portion 61 of the nose piece 60. Mixed water outlet passageway 71 is in communication with mixed water outlet port 56 in the hemispherical wall of socket body 40. Another passageway, hot water inlet passageway 72, has an inlet opening 73 in the hemispherical portion 61 of nose piece 60. The opening 73 is centered over inlet port 44 in the socket body 40. The spring loaded seat 46 in port 44 forms a watertight seal between the nose piece 60 and the socket body 40 around the opening 73. Similarly, the third passageway, the cold water inlet passageway 70, has an inlet opening 74 in the hemispherical portion 61 centered over cold water inlet port 42 in the socket body 40, and is sealed against leakage by spring loaded seat 46.

As best seen in FIG. 5 two arcuate shaped cavities 75 and 76 are provided in the recessed top surface 67 of nose piece 60. Cavity 75 is in communication with passageway 72, and cavity 76 is in communication with passageway 70. A mixed water discharge opening 78 is also provided in the recessed flat top surface 67, which opening is in communication with mixed water outlet passageway 71.

As best seen in FIG. 5 a radially inwardly extending key 79 is disposed in the interior of the cylindrical portion 62 of nose piece 60 above the recessed top flat surface 67. Key 79 engages keyway 91 in the periphery of fixed valve plate 90 preventing rotation of plate 90 relative to nose piece 60. A seal member 80 made of rubber or the like is disposed in a groove 89 formed in the recessed top surface 67 to form a watertight seal between surface 67 and fixed valve plate 90.

Notches 81 are provided in the outer surface of the cylindrical portion 62 of nose piece 60. The notches 81 have a groove or recess 82 therein so that a retaining lip 83 is formed therein. The notches 81 receive corresponding tabs 102 in the bottom of outer sleeve 101 of cartridge assembly to affix outer sleeve 101 against rotation to the nose piece 60. The distal ends of tabs 102 have an inwardly projecting protrusion 103 to be received in groove 82 so that the outer sleeve 101 is retained in the nose piece 60 via lips 83.

Fixed valve plate 90 is disposed within the cylindrical portion 62 of nose piece 60 and rests on top of recessed top flat surface 67. The fixed valve plate 90 has two arcuate shaped water inlet ports 92 and 93 extending axially therethrough, and a generally circular shaped mixed water outlet port 94 also extending axially therethrough. The shape of water inlet ports 92 and 93 conforms to the shape of the cavities 75 and 76 in the recessed top plate 67 of nose piece 60. The water inlet ports 92 and 93 are in communication with cavities 75 and 76 respectively. Mixed water outlet port 94 is in communication with mixed water discharge opening 78 in the recessed top plate 67. The seal member 80 forms a watertight seal between the inlet ports 92, 93 and mixed water outlet port 94, and between the cavities 75, 76 and mixed water discharge opening 78 when the fixed valve plate 90 is inserted into the cylindrical portion 62 of the nose piece 60 to rest securely on the recessed flat surface 67.

The cartridge assembly 100 comprises a cylindrical sleeve 101 open at its top and bottom ends is affixed against rotational movement to the nose piece 60 via tabs 102 depending downwardly from the bottom portion thereof engaging corresponding slots 81 in nose piece 60. A section of the wall 105 of the cylindrical sleeve is cut away to provide a window 106. A recess 108 is formed in the interior surface of the wall 105 extending axially downwardly from the bottom 107 of the window 106 to the open bottom end of the sleeve 101. Recess 108 is in communication at its top with window 106 and at its bottom end with the open bottom end of sleeve 101. An annular shaped portion 109 of the inner surface of wall 105 is also recessed; i.e., has a larger inner diameter than the inner surface of the wall immediately above, adjacent the open bottom end of sleeve 101 thereby forming inner shoulder 110 with the unrecessed interior surface of wall 105 above portion 109 in the interior of sleeve 101.

A hollow generally cylindrical housing 111 having wall 112 with an outer diameter smaller than the inner diameter of sleeve 101 is rotatably disposed within the hollow interior of sleeve 101. Housing 111 has a collar 113 at the open bottom end thereof. The top of collar 113 abuts against inner shoulder 110 in the interior of sleeve 101 thereby limiting axial upward movement of housing 111 within sleeve 101.

A raised portion 115 is provided on the outer surface of wall 112 of housing 111. Since the outer diameter of housing 111 at the raised portion 115 is greater than the inner diameter of sleeve 101, the raised portion projects, at least partially, through window 106. The height of raised portion 115 is sized so that raised portion 115 fits within window 106. The width of raised portion 115 is less than that of window 106 so that housing 111 can rotate within sleeve 101, said rotation being limited by the arc defined by window 106. The vertical sides 104 and 104a of window 106 thus act as stops to limit rotation of housing 111 in sleeve 101.

The inner diameter of recess 108 in the interior of wall 105 of sleeve 101 is greater than the outer diameter of housing 111 at the raised portion 115. Since the width of raised portion 115 is less than the width of recess 108 the raised portion fits within recess 108 thereby allowing housing 111 to be axially slidably inserted into the interior of sleeve 101 through the open bottom of sleeve 101.

Figure 2:
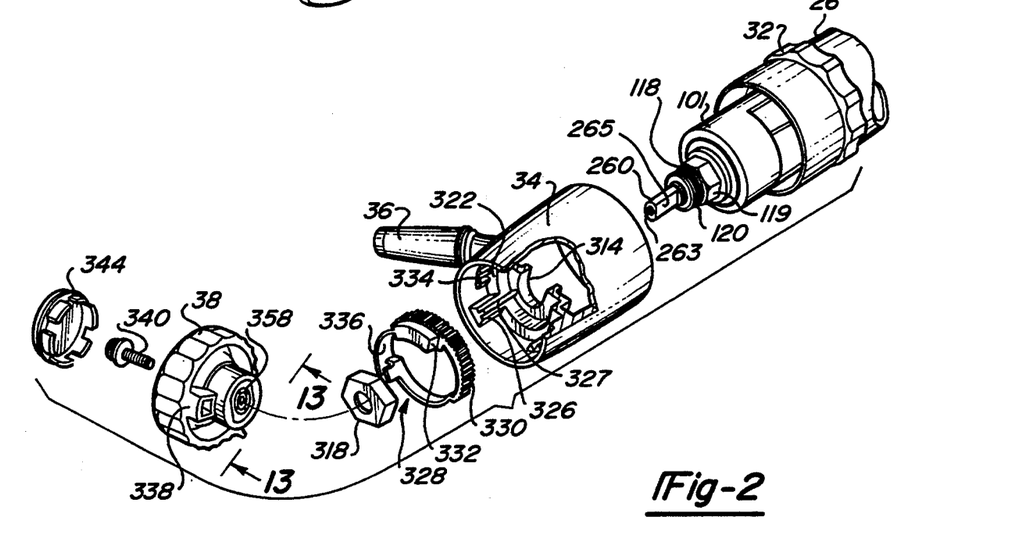
FIG. 2 is an exploded perspective and partially segmented view of the mixing valve illustrating the volume control handle, temperature control knob and their mounting on the respective stems of the mixing valve.
Figures 3, 4:
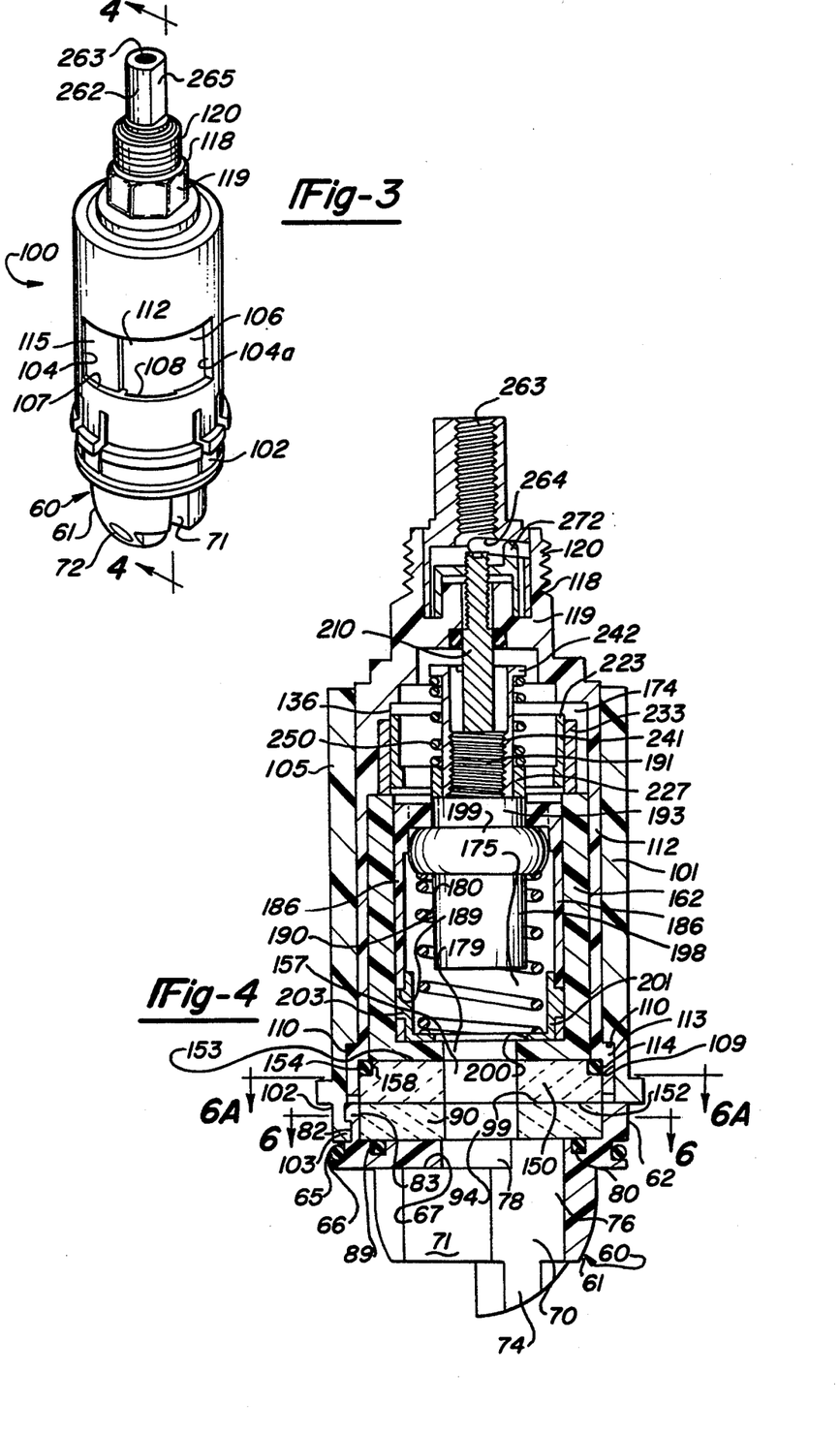
FIG. 3 is a perspective view of the assembled cartridge assembly.
FIG. 4 is an elevational, sectional view of the cartridge assembly shown in FIG. 3 with the piston in an intermediate position allowing flow of both hot and cold water into the mixing chamber.

Housing 111 has a volume control stem 118 at the top end thereof. The volume control stem 118 is rotated by handle 34 which has a non-circular opening 314 shaped to snugly receive a complementary shaped section 119 of volume control stem 118 and to secure it against rotational movement relative to handle 34. A lock nut 318 can then be threaded over threaded section 120 of stem 118 to secure the handle 34 onto the stem 118 and to also secure temperature control operating stem 260 within an annular cavity in volume control stem 118 against axial movement. Opening 314 and shaped section 119 may have rotationally asymmetric shapes (as illustrated in FIGS. 2 and 3) to assure that stem 118 has only one orientation with respect to opening 314. Rotation of handle 34 rotates stem 118 and, therefore housing 111.

A volume control valve plate 150 is fixedly mounted against rotational movement relative to housing 111 in the open bottom end of housing 111. Volume control valve plate 150 is secured against rotational movement relative to housing 111 by means of two keys 116 depending axially downwardly from collar 113 of housing 111 engaging corresponding keyways 151 in the rim of volume control valve plate 150. Voluble control valve plate 150 with O-ring 154 seals off the open bottom end of housing 111.

As best shown in FIG. 4, volume control valve plate 150 has a flat bottom surface 152 which is in slidable face to face contact with the flat upper surface 99 of fixed valve plate 90 when the cartridge 100 is mounted on the nose piece 60.

Volume control valve plate 150 has a first arcuate hot water inlet aperture 155 extending axially therethrough generally corresponding in size and shape to arcuate inlet aperture 92 in fixed plate 90, and a second arcuate cold water inlet aperture 156 extending axially therethrough generally corresponding in size and shape to arcuate inlet aperture 93 in fixed valve plate 90. Volume control plate 150 also has a centrally disposed generally circular shaped mixed water outlet aperture 157 therethrough corresponding in size and shape, and in constant communication with, mixed water outlet aperture 94 in fixed valve plate 90.

Rotation of volume control handle 34 causes rotation of volume control stem 118, housing 111, and volume control valve plate 150 relative to nose piece 60 and fixed valve control plate 90 fixedly mounted against rotation in nose piece 60. Rotational movement of valve plate 150 relative to fixed valve plate 90 may result in full alignment of apertures 155 and 156 in valve plate 150 with apertures 92 and 93 in fixed valve plate 90, partial alignment of apertures 155 and 156 with apertures 92 and 93, and total misalignment of apertures 155 and 156 with apertures 92 and 93.

When apertures 155 and 156 are fully aligned with apertures 92 and 93 the mixing valve 10 is in the full on or open position allowing full flow of both hot and cold water into the interior of cartridge assembly 100. When apertures 155 and 156 are partially aligned with apertures 92 and 93, the mixing valve 10 is in the partially on or open position allowing partial flow of hot and cold water into the interior of the cartridge assembly 100. When the apertures 155 and 156 are fully misaligned with apertures 92 and 93, i.e., apertures 155 and 156 are not in communication with apertures 92 and 93, the mixing valve 10 is in the off or closed position allowing no hot or cold water to enter into of cartridge assembly 100.

It should be noted that in the embodiment illustrated in the drawings, the size and shape of aperture 155 correspond to the size and shape of aperture 156, the size and shape of aperture 92 correspond to the size and shape of aperture 93, the sizes and shapes of apertures 155 and 156 correspond to the sizes and shapes of apertures 92 and 93, and in the full open position apertures 155 and 156 are completely aligned and in full communication with apertures 92 and 93. Under these circumstances the volume of flow of hot and cold water through the apertures into the interior of cartridge 100 are equal, except in the case when either the hot water supply or the cold water supply pressure drops—the pressure drop can occur if another faucet, dishwasher, or washing machine is turned on, or a toilet is flushed. Misalignment of apertures 155 and 156 from apertures 92 and 93 decreases the total volume of water flowing through the apertures into the interior of cartridge assembly, but it does not vary the ratio of the volume of cold and hot water flowing through the apertures into the cartridge assembly interior. The ratio of the volume of hot water and cold water flowing into the cartridge assembly interior remains equal.

The ratio of the volume of cold water to hot water exiting through mixed water outlet aperture 157 and mixed water outlet port 94 is controlled, as hereinafter described, in the cartridge assembly 100.

It is to be understood that varying the shape and/or size of aperture 155 relative to aperture 156, or varying the shape and/or size of aperture 92 relative to aperture 93, will change the ratio of the volume and/or the volume of hot water and cold water entering the interior of cartridge assembly 100.

Furthermore, in the intermediate partially on position or in the full on position, seats 46, which function as seals between water supply ports 42 and 44 in socket body 40 and inlet ports 73 and 74 in nose piece 60, prevent any water from reaching mixed water discharge port 56 in the socket body 40 without first passing through the cartridge 100 as explained below. In addition, cross flow between ports 42 and 44 is prevented.

The top surface 153 of volume control plate 150 has a circumferentially extending recess at its outlet periphery 158 that receives an O-ring 154. The volume control plate 150 is seated in the open bottom of housing 111 with the O-ring being received in inner shoulder 114 of housing 111 forming a water tight seal between the volume control plate 150 and housing 111. The volume control plate 150 and the wall 112 of housing 111 define a cavity 121 within housing 111.

Figures 6A, 16:
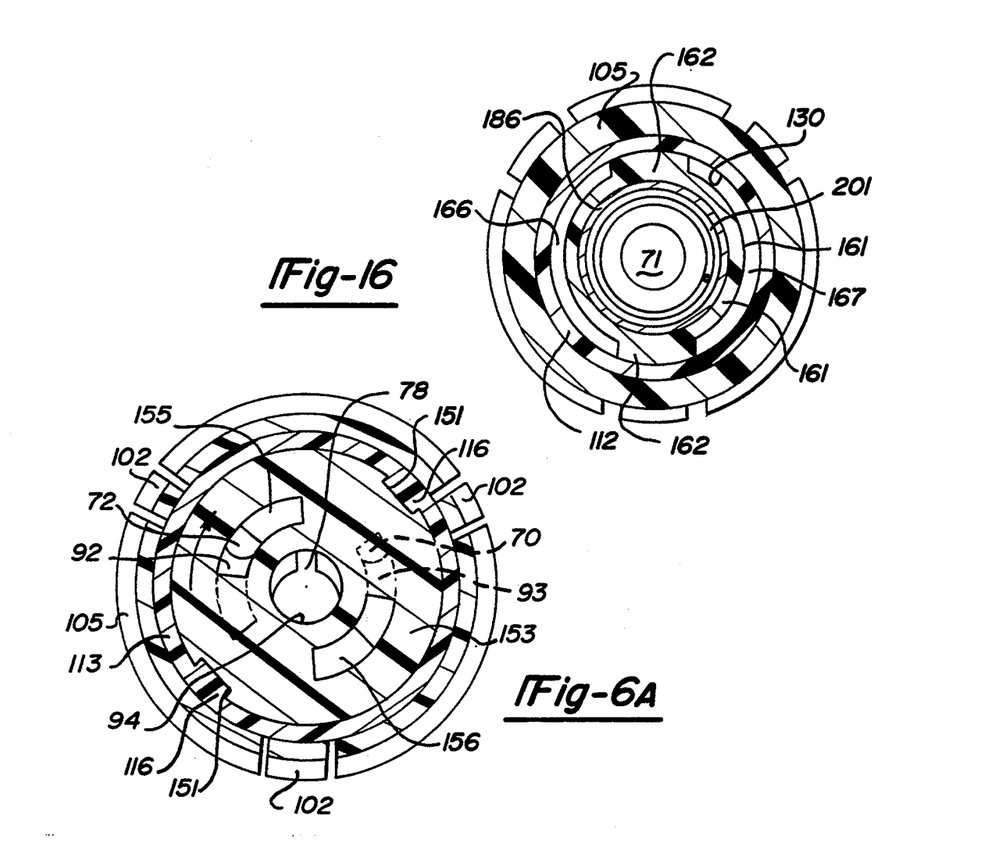
FIG. 6a is a fragmentary cross-sectional view taken along lines 6A–6M in FIG. 4 with the volume control plate rotated to a partial on position.
FIG. 16 is a cross-sectional view taken along lines 16—16 in FIG. 15.

Disposed within cavity 121 of housing 111 is inner housing 160. Inner housing 160 is preferably made of an elastomeric material such as, for example, hard rubber. Inner housing 160 has a hollow interior forming a mixing chamber 175 defined by side wall 161 and bottom wall 163. Two longitudinally or axially extending ribs 162 are formed in the outer surface of wall 161. The ribs 162 are circumferentially spaced apart, preferably spaced apart 180 degrees from each other. The ribs 162 have a larger outer diameter than wall 161. As best shown in FIG. 16, with the inner housing 160 disposed within cavity 121 the ribs 162 form a water tight interference fit with the inner surface 130 of wall 112 of housing 111. Since the outer diameter of wall 161 is smaller than the outer diameter of ribs 162, the ribs 162, wall 161 and the inner surface 130 of wall 112 of housing 111 define two longitudinally or axially extending water inlet passageways, a cold water inlet passageway 167 and a hot water inlet passageway 166.

The top of inner housing 160 is open while the bottom closed by bottom wall 163. The bottom wall 163 has a centrally disposed, circular shaped boss 164 depending axially downwardly therefrom. Boss 164 is joined by radially extending extensions 165 of ribs 162 thereby forming two relieved or cut away horizontally extending portions 177 and 177a on either side of ribs 162. These relieved portions 177 and 177a form the bottom, radially extending sections of passageways 166 and 167.

A mixed water discharge opening 179 is provided in the bottom wall 163. The mixed water outlet opening 179 also extends axially through boss 164 and is in communication with mixed water outlet aperture 157 in volume control plate 150.

With the inner housing 160 disposed within housing 111 the bottom surface of boss 164 and the bottom surfaces of radial extensions 165 of ribs 162 are in surface to surface contact with the top surface 153 of volume control valve plate 150. The boss 164 forms a watertight seal between mixed water outlet aperture 157 and the two arcuate inlet apertures 155 and 156 of volume control plate 150. Furthermore, the boss 164 and the two radial extensions 165 of ribs 162 form watertight seals between arcuate water inlet apertures 155 and 156 in plate 150, thereby forming, together with the top surface 153 of plate 150 the bottom sections 177 and 177a of hot water passageway 166 and cold water passageway 167, respectively. In operation hot water from inlet aperture 155 of plate 150 enters relieved portion 177 which forms the bottom radially extending section of hot water passageway 166, while cold water from inlet aperture 156 enters relieved portion 177a which forms the bottom radially extending section of cold water passageway 167.

The ribs 162 are tapered at their top ends to form mounting points 169 for the cylinder 230 as described hereinafter. Furthermore, at the top portion of inner housing 160 one section 168, generally semicircular in extent, of wall 161 is higher than the adjoining semicircular section 170. This results in the wall 161 having a stepped section 171 at its top end.

As mentioned above a mixing chamber 175 or mixed water discharge passageway having an open top end is defined within inner housing 160 by side wall 161 and bottom wall 163. Disposed within chamber 175 is a temperature sensing wax thermostatic control element 190 which actuates the piston 220 as described hereinafter. Thermostatic control element 190 is of a type well known in the art and is commercially readily available, as for example from Caltherm of Bloomfield Hills, Mich. It also operates in a conventional and well known manner. Briefly, thermostatic control element 190 comprises a cup filled with wax or a mixture of wax and metal powder 195, e.g., copper powder. The wax and powder mixture is enclosed in the cup by means of a membrane made of elastomer in the form of a diaphragm 194 or glove finger adapted to function as a seat for temperature control thrust rod 210. Upon heating the wax and copper powder mixture expands, thereby pushing the diaphragm in an upward direction. Upon cooling, the wax and copper powder mixture contracts and the diaphragm is free to move downwardly in the cup interior.

The thermostatic control element 190 has an externally threaded neck 191 at the top of its top section 193. A passageway 192 extends through the threaded neck 191 and top section 193 and communicates with the interior of the cup above the diaphragm 194. Passageway 192 receives in slidable relation the bottom portion of temperature control thrust rod 210, with the bottom 211 of temperature control thrust rod 210 seated in the interior of the cup on the diaphragm 194. Thermostatic control element 190 also has a section 199 of increased diameter. Section 199 serves as the top seat for helical spring 180 disposed in cavity 175. The lower section 198, i.e., the section intermediate section 199 and the bottom of element 190, of thermostatic control unit 190 functions as the spring guide for spring 180. As illustrated in FIG. 4 a bottom spring stop 201 for helical spring 180 is inserted into the bottom of cavity 175 in inner housing 160. Bottom spring stop 201 has a circular opening 200 in the bottom wall thereof preferably having a diameter larger than mixed water outlet opening 179 in the bottom wall 163 of inner housing 160 and is in communication with mixed water outlet opening 179.

The spring 180 biases the thermostatic control element 190 in an upward direction in the cavity 175 in inner housing 160. To prevent thermostatic control element 190 from being upwardly ejected from the cavity 175 in inner housing 160, and to limit its upward movement therein, a thermostatic control element retaining member 183 is disposed within inner housing 160. Retaining member 183 is comprised of longitudinally or axially extending ribs 186 having slots 189 adjacent their bottom ends. Slots 189 receive radial projections 203 in the side wall of bottom spring stop 201. The thermostatic control element retaining member 183 is thus locked to bottom spring stop 201. The thermostatic control element retaining member 183 also includes a top horizontally extending section 187 sized to fit within the open end of inner housing 160. Top section 187 has a central opening 185 therein having a diameter larger than the diameter of threaded neck 191, whereby neck 191 fits within and extends through said opening 185, but smaller than the diameter of enlarged diameter section 199 of thermostatic control element 190 thereby preventing the thermostatic control element from existing through the open end of inner housing 160. Top section 187 also has a plurality of openings 184 radially spaced from central opening 185 and circumferentially spaced apart from each other. Openings 185 and 184 are in communication with cavity 175 in inner housing 160. Retaining member 183 and bottom spring stop 201 form a cage enclosing spring 180 and thermostatic control element 190.

Disposed on and resting on top of top section 193 of thermostatic control element 190 is piston 220. Piston 220 has a side wall 223 and a bottom wall 224. Bottom wall 224 has a plurality of openings 222 extending therethrough. A downwardly extending annular boss 227 is located in the central portion of bottom wall 224. Boss 227 has an opening 221 therethrough. The boss 227 has an inner diameter that is greater than the outer diameter of threaded neck 191 so that it fits over threaded neck 191. The outer diameter of boss 227 is sized so that boss 227 is seated on top of top section 193 of element 190 and slidably fits through central opening 185.

A spring retainer and guide element 240 having a hollow internally threaded tubular section 241 is screwed down on threaded neck 191 to abut against the top of top section 193. Since the outer diameter of tubular section 241 is smaller than the inner diameter of opening 221 extending through boss 227, tubular section 241 passes through opening 221 in boss 227 and rests on top of top section 193 of thermostatic control element 190. A spring 250 is mounted over the tubular section 241 of spring retainer and guide 240. Spring 250 is seated at its bottom end on bottom wall 224 of cylinder piston 220 and at its top end on radially extending upper lip 241 of spring retainer and guide element 240. Spring 250 biases the boss 227 into contact with the surface of element 190, e.g., top section 193 and, therefore, biases the piston 220 downwardly toward the cup of thermostatic control element 190.

Cylinder 230 is fixedly seated on the top open end of inner housing 160, more particularly on the higher section 168 of wall 161, via slots 232 in downwardly depending flanges 231 engaging mounting points 169 at the tapered top ends of ribs 162 of inner housing 160.

Because of stepped section 171 in the top of wall 161, the bottom of wall 233 of cylinder 230 and the top of wall section 170 of wall 161 define a radially extending generally semicircular water supply opening 172 which allows hot water to flow into the interior of inner housing 160 where it comes into contact with thermostatic control element 190.

Since the inner diameter of cylinder 230 is larger than the outer diameter of piston 220, piston is vertically or axially slidable within cylinder 230. The height of wall 223 of piston 220 is generally about the same or less than the height of wall 233 of cylinder 230.

Downward axial sliding movement of piston 220 within cylinder 230 closes or partially closes (depending upon the degree of downward movement) aperture 172 thereby shutting off or reducing the flow of hot water through water supply opening 172 into the interior of inner housing 160 and into contact with thermostatic control element 190. Conversely, upward movement of piston 220 within cylinder 230 opens or partially opens (depending upon the degree of movement) hot water supply opening 172 thereby allowing or increasing the flow of hot water through aperture 172.

The piston 220 is sized so that it fits snugly in cylinder 230, with the wall 223 of piston 220 forming a seal with the wall 233 of cylinder 230. At its down or closed position, the bottom of wall 223 of piston 220 also forms a watertight seal with section 170 of wall 161 of inner housing 160.

Figure 7:
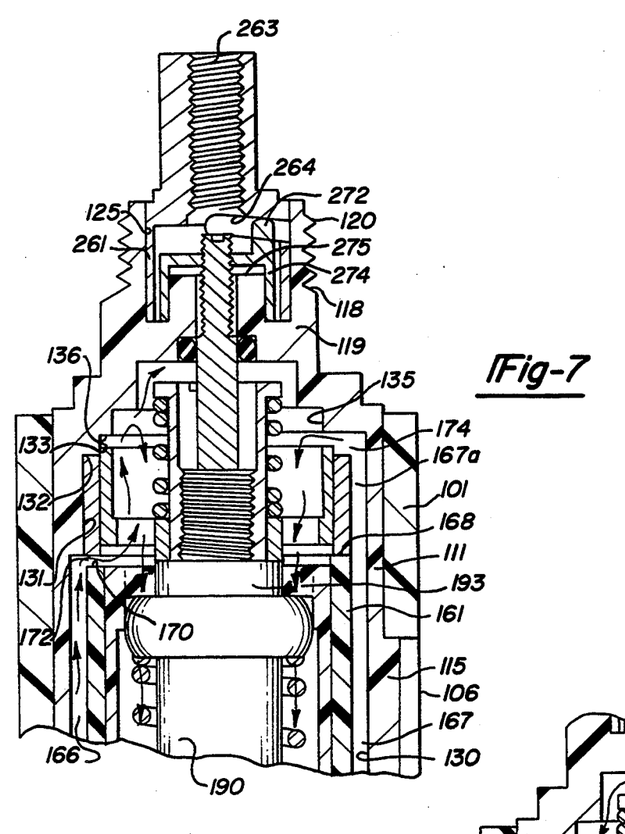
FIG. 7 is a fragmentary, elevational, sectional view of the upper portion of the cartridge assembly shown in FIG. 3 with the piston in an intermediate position allowing the flow of hot and cold water into the mixing chamber.

The interior surface 130 of wall 112 of housing 111 has at its upper portion two sections 131 and 133 of reduced inner diameter. Section 133 has a smaller inner diameter than section 131, thereby forming an inner shoulder 132 therebetween. These two sections 131 and 133 do not extend completely around the inner circumference of the interior surface 130 of wall 112 but are semicircular in shape. They thus correspond in circumferential extent to lower section 170 of wall 161 of inner housing 160. Inner shoulder 132 is therefore likewise semicircular in shape. As best shown in FIG. 7 section 131 is sized to sealingly confront a semicircular section of wall 233 of cylinder 230. Shoulder 132 is adapted to function as a semicircular seat for the top semicircular portion of cylinder 230. As also best shown in FIG. 7 section 133 is sized to sealingly confront a semicircular portion of the wall 223 of piston 220 when piston 220 is in its extended or up position.

A third section 135 of the interior surface 130 of wall 112, which section is disposed above section 133, also has a reduced inner diameter. The inner diameter of section 135 is smaller than that of section 133. Section 135 extends around the entire inner circumference of the inner surface 130 of wall 112, thereby forming shoulder 136 which is adapted to function as a seat for the top of piston 220 when it is in its top or extended position.

Because of the semicircular shape of sections 131 and 133 of the inner surface 130 of wall 112, the cold water inlet passageway 167 includes cold water inlet passageway extension 167a.

As mentioned above the bottom 211 of temperature control thrust rod 210 is seated on diaphragm 194 in the interior of the cup of thermostatic control element 190. The top end 212 of temperature control thrust rod 210 is externally threaded and extends through and beyond opening 123 in the raised boss 122 disposed in the hollow interior of volume control stem 118 of housing 111. The outer surface of the side wall of boss 121 and the inner surface 125 of the wall of volume control stem 118 define an annular recess.

The top threaded end 212 of temperature control thrust rod 210 threadably engages internally threaded aperture 271 extending through top wall 273 of cam follower 270. Cam follower 270 includes a side wall 274 which defines together with top wall 273 an interior cavity which is in communication with internally threaded aperture 271. This interior cavity is sized to fit over boss 122 with the side wall being disposed within the annular recess defined by the side wall of boss 121 and the inner surface 125 of wall volume control stem 118. The cam follower 270 is thus vertically or axially slidably mounted over boss 122. Side wall 274 of cam follower 270 has keyway 275 therein which receives key 122 in the boss 122 to prevent rotational movement of cam follower 270 relative to boss 121.

Temperature control operating stem 260 is rotatably positioned over cam follower 270 in the annular cavity defined by the outer surface of side wall 274 of cam follower 270 and inner surface 125 of the wall of volume control stem 118 via its complementary shaped mating section 261. Temperature control operating stem 260 has a semicircular, slanted, e.g., diagonally extending, camming surface 264 which is adapted to engage cam follower element 272 disposed on the top wall 271 of cam follower 270.

In the construction illustrated in the drawings camming surface 264 is highest, i.e., furthest from the bottom of temperature control operating stem 260, at its left terminus 264a and lowest, i.e., closest to the bottom of operating stem 260, at its right terminus 264b. The camming surface 264 thus slopes downwardly toward the bottom of temperature control operating stem 260 from its left terminus 264a to its right terminus 264b.

The cam follower element 272 is biased upwardly into contact with camming surface 264 in the following manner: thermostatic control element 190 is biased upwardly in cavity 175 by spring 180; upward movement of thermostatic control element 190 results in upward movement of temperature control thrust rod 210 whose bottom 211 is seated on the diaphragm in the interior of thermostatic control element 190; upward movement of temperature control thrust rod 210 forces cam follower 270, to which thrust rod 210 is threadably engaged, in an upward direction. Abutment of cam follower element 272 against camming surface 264 limits upward travel of cam follower 270, thrust rod 210, and therefore, of thermostatic control element 190.

Because of the left to right downward slant of camming surface 264, rotation of the temperature control operating stem 260 in a clockwise direction forces cam follower 270 downwardly and, therefore, moves thermostatic control element 190 downwardly in cavity 175. Cam follower 270 moves downwardly because the downward force exerted by camming surface 164 on cam follower 270 is sufficient to overcome the upward force exerted on cam follower 270 by spring 180, which upward force is transmitted to cam follower 270 through thermostatic control element 190 and thrust rod 210.

As discussed previously the volume control stem 118 is rotated by handle 34. Handle 34 has an upper section with a seat 322 with a splined section 324 thereabout and an axially extending top shoulder 326. A rib 327 extends radially inwardly from shoulder 326. An arcuate hot water stop ring 328 has a complementary splined section 330 which can be adjustably positioned and secured to the splined section 324 about a number of rotated positions. The ring 320 has a stop shoulder 332 and arcuate rib 336. The ring 328 abuts against rib 327 to be frictionally engaged in place in seat 322.

Figures 12, 13, 14:
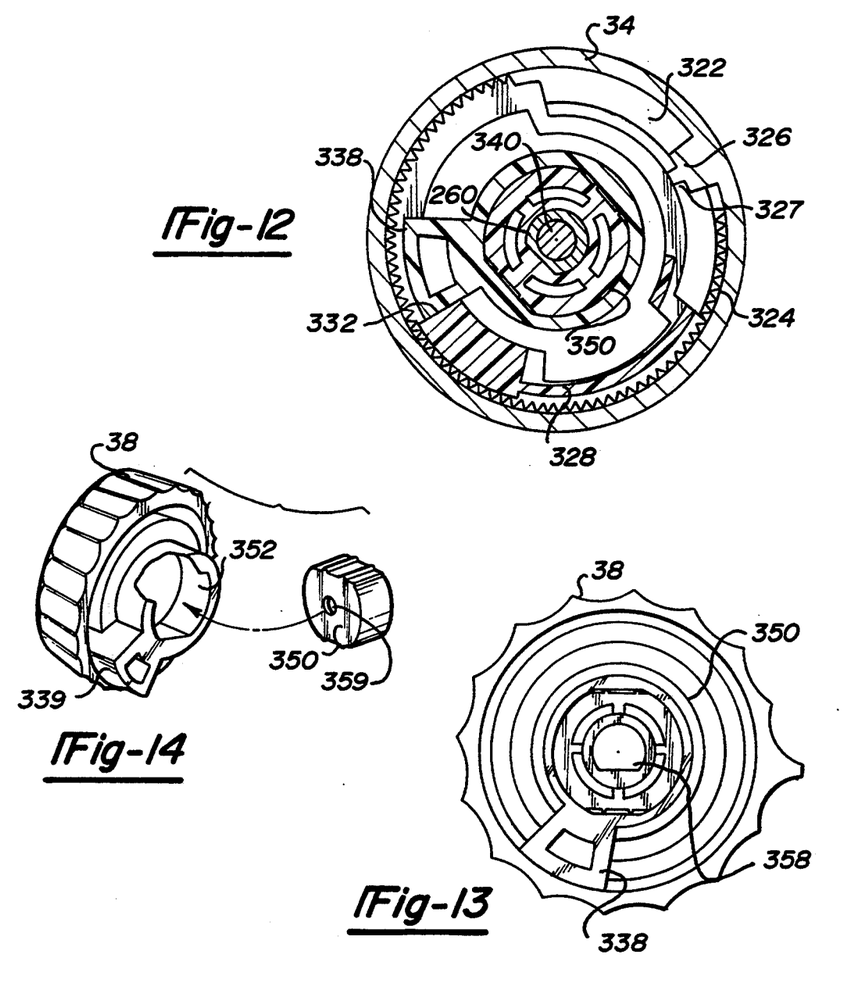
FIG. 12 is a view similar to FIG. 11 with the hot water stop member adjusted for a lowered maximum water temperature and the temperature control knob rotated to the maximum hot position against the stop member.
FIG. 13 is a bottom plan view of the temperature control knob and orienting insert.
FIG. 14 is an exploded perspective view of the temperature control knob and orienting insert.

As shown in FIGS. 2, 12 and 13, the temperature control stem 260 receives the temperature control knob 38 such that its stop shoulder 338 can rotate between the shoulders 326 on handle 34 and the stop shoulder 332 on member 328. A screw 340 threads into a hole 263 in stem 260 to secure the temperature control knob thereon. A cosmetic cap 344 fits within a recess 346 in temperature control knob 38.

Referring to FIG. 14, the temperature control knob 38 has an orienting insert 350 which fits within a lower recess 352 in the temperature control knob 38. The insert 350 has a rotatably asymmetrical aperture 358 which is D-shaped to fit onto the D-shaped upper portion 265 of temperature control stem 260 in one rotated position only. The aperture 358 does not extend all the way through insert 350. Only a smaller screw hole 359 extends through insert 350 so that insert 350 cannot be mounted upside down on stem 260.

Operation of the Valve

The housing 111 can be rotated by volume control handle 34 to an off position so that the volume control valve plate 150 has its inlet apertures 155 and 156 totally misaligned with the water inlet ports 92 and 93 in fixed valve plate 90 such that no water flows into the interior of the cartridge assembly. When in the off position, the raised portion 115 on the outer surface of wall 112 of housing 111 abuts against vertical side 104 of window 106 in sleeve 101 as shown in FIG. 3. The handle 34 can be rotated counterclockwise so that the raised portion 115 is rotated away from vertical side 104 to any position in the window 106 up until raised portion 115 abuts vertical side 104a at which point the valve is in the full on position with the inlet apertures 155 and 156 are fully aligned with inlet ports 92 and 93. The inlet apertures 155 and 156 can be partially aligned with inlet apertures 92 and 93 such as shown in FIG. 6 or can be fully aligned with inlet ports 92 and 93. The inlet apertures 155 and 156 are preferably the same size and are preferably positioned to provide the same degree of partial alignment simultaneously with respect to inlet ports 92 and 93.

Figure 8:
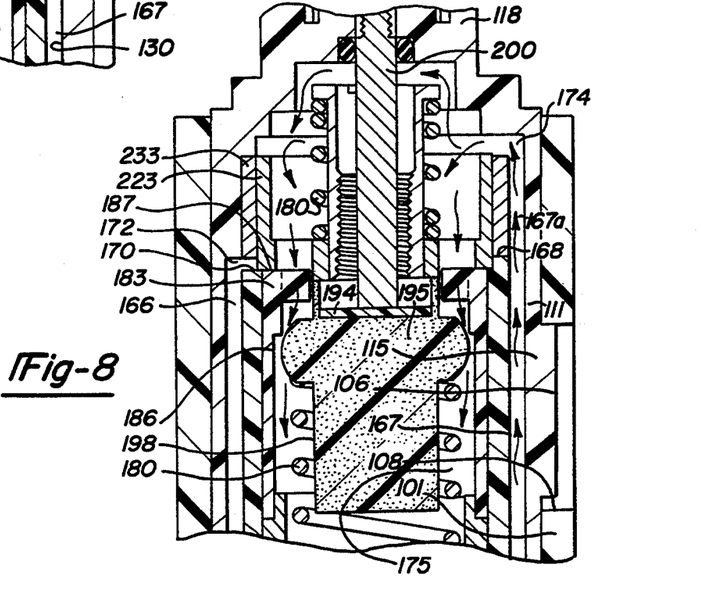
FIG. 8 is a view similar to FIG. 7 except that the thermostatic control element is segmented to illustrate the temperature control thrust rod seated upon the diaphragm and the piston is in the full down position allowing the flow of only cold water into the mixing chamber.

With the cold water inlet aperture 156 aligned with cold water inlet port 93, cold water flows into cold water inlet passageway 167 and into cold water inlet passageway extension 167a which is in communication with cold water inlet passageway 167. As best shown in FIGS. 7 and 8 the cold water then flows from cold water inlet passageway extension 167a through the semicircular cold water supply opening 174 defined by the top of wall 233 of cylinder 230, the top of wall 223 of piston 220, and shoulder 136 in the interior surface 130 of wall 112 of housing 111 into the cavity 175 in inner housing 160. The cold water flows over and contacts the thermostatic control element 190 disposed in the cavity 175 of inner housing 160.

Figure 15:
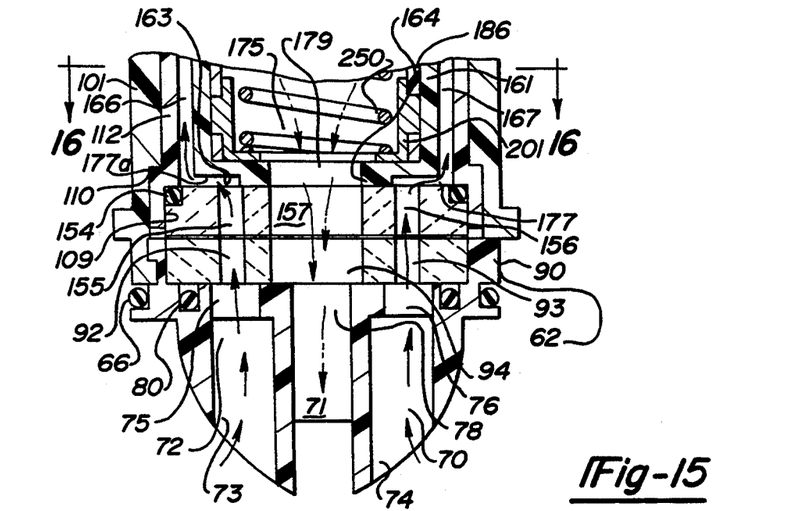
FIG. 15 is an elevational, sectional view of the bottom portion of the cartridge assembly shown in FIG. 3.

Likewise, with the hot water inlet aperture 155 aligned with hot water inlet port 92, hot water flows into hot water inlet passageway 166. As best shown in FIG. 9 the hot water then flows from hot water inlet passageway 166 through a semicircular hot water supply opening 172 defined by the top of wall section 170 of wall 161, the bottom of wall 233 of cylinder 230, and the bottom of wall 223 of piston 220 into the cavity 175 in inner housing 160 where it mixes with the cold water. The mixed hot and cold water then flows into mixing chamber 175 over thermostatic control element 190 and exits chamber 175 through mixed water outlet opening 179 as best shown in FIG. 15. The mixed water exits the valve assembly 100 by flowing through mixed water outlet aperture 157, mixed water outlet port 94, and mixed water outlet passageway 71.

The amount of cold and hot water flowing into chamber 175 is controlled by axial or vertical movement of piston 220 within cylinder 230 which is fixed against axial movement. Upward axial movement of piston 220 results in the top of wall 223 of cylinder piston 220 approaching shoulder 136, thereby narrowing cold water supply opening 174. This reduces the flow of cold water from cold water inlet passageway extension 167a through cold water supply opening 174 into chamber 175, and results in hotter water existing through mixed water outlet 179. However, as the top of wall 223 approaches shoulder 136, the bottom of wall 223 moves away from top of wall section 170, thereby widening or opening hot water supply opening 172. This increases the flow of hot water from hot water inlet passageway 166 through hot water supply opening 172 into chamber 175. Conversely, downward axial movement of piston 220 within cylinder 230 results in the bottom of wall 223 of piston 220 approaching the top of section 170 of wall 161, thereby narrowing hot water supply opening 172. This reduces the flow of hot water into chamber 175 through hot water supply opening 172, and results in colder water exiting through mixed water outlet 179.

FIG. 8 shows the piston 220 in its full down position with hot water inlet opening 172 completely closed by the bottom of wall 223 of cylinder piston abutting against section 170 of wall 161 of inner housing 160. In this position no hot water flows into chamber 175. However, as also shown in FIG. 8, with hot water supply opening 172 closed by wall 223 of piston 220, cold water supply opening 174 is in its full open position with the top of wall 223 of piston 220 being at its furthest point from shoulder 136. In this position only cold water flows into chamber 175.

FIG. 9 shows the piston 220 in its full up position within cylinder 230 with cold water inlet opening 174 completely closed by the top of wall 223 of piston 220 abutting against shoulder 136. In this position no cold water flows into chamber 175. However, as also shown in FIG. 9, with cold water supply opening 174 closed by wall 223 of piston 220, hot water supply opening 172 is in its full open position with the bottom of wall 223 being at its furthest point from the top of section 170 of wall 161. In this position only hot water flows into chamber 175.

FIGS. 4 and 7 show the piston 220 in its partially down position, i.e. intermediate position, in cylinder 230. In this position cold water supply opening 174 and hot water supply opening 172 are both partially open allowing the flow of both cold and hot water into chamber 175.

Thus, the temperature of the water exiting through mixed water outlet 179 is a function of the axial position of piston 220. The higher the position of the piston 220 within cylinder 230, i.e., the closer the top of wall 223 of the piston is to shoulder 136, the smaller the cold water supply opening 174 and the higher the temperature of the water exiting mixed water outlet 179. The lower the position of the piston 220 within cylinder 230, i.e., the further the top of wall 223 of the piston is from shoulder 136 and, therefore, the closer the bottom of wall 223 is to section 170 of wall 161, the smaller the hot water supply opening 172 and the lower the temperature of the water exiting mixed water outlet 179.

In other words, in the present invention a decrease in size of cold water supply opening 174 results in a corresponding and automatic increase in the size of the hot water supply opening 172 and vice versa.

The axial or vertical movement of piston 220 within cylinder 230, which cylinder 230 does not move axially or vertically but is fixedly disposed on the top of inner housing 160 as described hereinafore, is caused by axial or vertical movement of thermostatic control element 190, to which piston 220 is operably connected, within chamber 175 in inner housing 160.

As described hereinafore the bottom portion of temperature control thrust rod 210 is disposed within internal passageway 192 in threaded neck 191 of thermostatic control element 190 with the bottom 211 of thrust rod 210 seated on the diaphragm in the interior of thermostatic control element 190. The threaded top portion 212 of rod 210 is threadably engaged with cam follower 270. Temperature control thrust rod 210 is fixed against upward axial or vertical movement within chamber 175 in a predetermined or preselected axial position by rotation of the temperature control operating stem 260 and, therefore camming surface 264 therein. As shown in FIG. 7 rotation of temperature control operating stem 260 in a clockwise direction brings portion 264b of camming surface 264 in contact with cam follower element 272. Since portion 264b of camming surface 264 is lower than portion 264a, i.e., closer to the bottom of temperature control operating stem 260, cam follower 270 is forced downward on boss 121, thereby moving temperature control thrust rod 210, which is connected to cam follower 270, in a downward direction. Downward movement of thrust rod 210 forces thermostatic control element 190 to move down in chamber 175. Downward movement of element 190 causes downward movement of piston 220 which is operably connected to element 190. Since the upward force exerted on thermostatic control element 190 by spring 180 is insufficient to overcome the downward force exerted on element 190 through thrust rod 210 by cam surface 264 engaging cam follower 270, temperature control thrust rod 210 is fixed in this axial position unless and until the temperature control operating stem 260 is again rotated.

When thrust rod 210 travels downwardly the bottom 211 thereof pushes against the diaphragm within thermostatic control element 190, thereby forcing the thermostatic control element 190 in a downward direction in chamber 175. This results in a corresponding downward movement of spring retainer and guide element 240 which is threadably engaged with neck 191 of thermostatic control element 190. When lip 242 of retainer and guide element 240 moves in a downward direction it forces spring 250, the top of which is seated against annular lip 242, to move downwardly. Downward movement of spring 250 exerts a downward force upon bottom wall 224 of piston cylinder 220 upon which the bottom of spring 250 is seated. This forces piston 220 in a downward direction. Downward movement of piston 220 results in downward movement of wall 223 thereof thereby reducing the size of hot water supply opening 172 and increasing the size of cold water supply opening 174. This increases the flow of cold water and decreases the flow of hot water into chamber 175.

As shown in FIG. 9 rotation of temperature control operating stem 260 in a counterclockwise direction raises camming surface 264 away from cam follower element 272. This is due to portion 264a of camming surface 264 being higher than portion 264b. However, since camming surface 264 is raised off of cam follower element 272, there is now no downward force exerted upon temperature control thrust rod 210 and, therefore, on thermostatic control element 190. Therefore, spring 180 forces thermostatic control element 190 in an axially upward direction. Upward movement of element 190 causes thrust rod 210 and cam follower 270 to which thrust rod 210 is connected to move upwardly. This upward travel continues until cam follower element 272 abuts against cam surface 264. With cam follower element 272 abutting against cam surface 264, the thrust rod is fixed in this axial position unless and until the temperature control operating stem 260 is again rotated.

In its axial upward travel thermostatic control element 190 carries with it spring retainer and guide element 240, spring 250 and piston 220. Upward movement of piston 220 causes wall 223 thereof to move upwardly away from section 170 of wall 161 and toward shoulder 163, thereby increasing the size of hot water supply opening 172 and decreasing the size of cold water supply opening 174. This increases the flow of hot water and decreases the flow of cold water into chamber 175.

Rotation of temperature control operating stem 260 is accomplished by rotation of temperature control knob 38 which is connected to stem 260.

Figure 11:
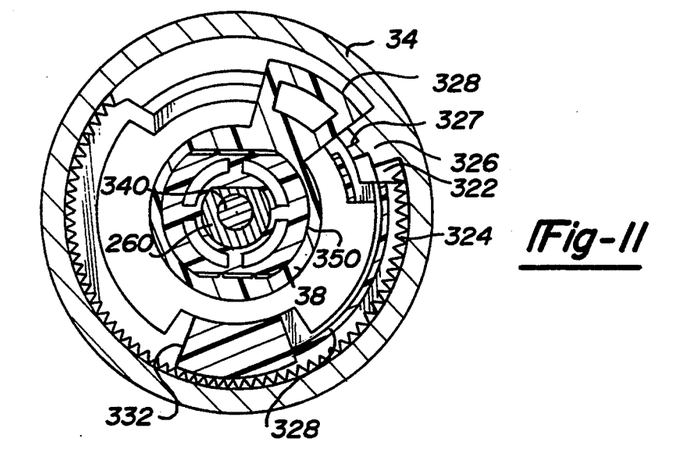
FIG. 11 is a cross-sectional view taken along lines 11—11 in FIG. 2 with the temperature control knob rotated to the cold position.

The maximum water temperature can be easily adjusted by removing cap 344 and unscrewing screw 340 so that temperature control knob 38 is removed. The hot water stop ring 328 can then be removed, rotated and reinserted in the splined section 334 of handle 34. The splines 334 are sized such that rotation of the ring member 328 one notch or one spline will reduce the maximum water temperature by a predetermined amount, e.g., approximately 2 degrees Fahrenheit. The position of ring 328 as shown in FIG. 12 reduces the counterclockwise rotation of the temperature control knob 34 as compared to FIG. 11. Thus the maximum temperature of the water is also reduced. The adjustment of the maximum hot water temperature allowed via ring 328 can be achieved without shutting off the water supply or major disassembly of the valve.

Once a desired water temperature has been preselected by rotation of the temperature control knob 38, the water exiting the chamber 175 is automatically maintained at this temperature. This is accomplished by the thermostatic control element 190 moving either upwardly or downwardly within chamber 175 in response to the water temperature in chamber 175. Thus, for example, if for some reason the flow of cold water into chamber 175 through cold water supply opening 174 decreases, the temperature of the water in mixing chamber 175 increases. This hotter water will heat the thermostatic control element 190 thereby causing the thermally expansible material located in the interior of the element 190 below the diaphragm to expand. Expansion of the thermally expansible material, e.g., wax mixed with copper powder, forces the diaphragm in an upward direction in element 190. However, upward travel of the diaphragm is prevented by the bottom 211 of axially fixed thrust rod 210 abutting against the diaphragm. Therefore, upward movement of the diaphragm in element 190, moves the thermostatic control element 190 downwardly in chamber 175. Downward movement of element 190, as discussed above, results in a narrowing of hot water supply opening 172 and a corresponding expansion of cold water supply opening 174 by the associated downward movement of piston 220. The narrowing of hot water supply opening 172 and the widening of cold water supply opening 174 allows more cold water and/or less hot water to flow into chamber 175, thereby maintaining the temperature of the mixed water in chamber 175.

If the supply of cold water to chamber 175 is substantially or completely interrupted, thermostatic control element 190 travels downwardly a sufficient distance so that the wall 223 of piston 220 completely closes hot water supply opening 172, thereby shutting off the flow of hot water into chamber 175. Such a situation is illustrated in FIGS. 7 and 8.

If, on the other hand, the flow of hot water into chamber 175 through hot water supply opening 172 is decreased, the temperature of the water in mixing chamber 175 will decrease. This colder water will cool the thermostatic control element 190 thereby causing the thermally expansible material in the interior of element 190 to contract. With the contraction of the thermally expansible material the diaphragm is free to move downwardly within element 190 away from the bottom 211 of axially fixed thrust rod 210. However, spring 180 continuously forces the thermostatic control element upwardly thereby maintaining contact between the diaphragm and the bottom 211 of thrust rod 210. Upward movement of element 190, as described above, results in a narrowing of cold water supply opening 174 and a corresponding widening of hot water supply opening 172 by the associated upward movement of piston 220. The narrowing of cold water supply opening 174 and the widening of hot water supply opening 172 allows more hot water and/or less cold water to flow into chamber 175, thereby maintaining the temperature of the mixed water in chamber 175.

If the supply of hot water to chamber 175 is substantially or completely interrupted, thermostatic control element 190 travels upwardly a sufficient distance so that the wall 223 of piston 220 completely closes cold water supply opening 174, thereby shutting off the flow of cold water into chamber 175. Such a situation is illustrated in FIG. 9.

Other modifications can be made to those which have been described in the text and illustrated in the figures by way of example without departing from the scope of the instant invention.

What is claimed is:

1. A mixing valve comprising:

a housing having a cavity with a hot water supply port, a cold water supply port and a mixed water discharge port in communication with said cavity;

a cartridge removably mounted in said cavity of said housing, said cartridge containing valving means containing hot water inlet aperture in communication with said hot water supply port, cold water inlet aperture in communication with said cold water supply port, and mixed water outlet aperture in communication with said mixed water discharge port for controlling volume flow to said cartridge;

a hot water passageway having an upstream end and a downstream end in communication with said hot water inlet aperture of said valving means at the upstream end thereof, a cold water passageway having an upstream end and a downstream end in communication with said cold water inlet aperture of said valving means at the upstream end thereof, and a mixed water discharge passageway in communication with said mixed water outlet aperture of said valving means at the upstream end thereof, said hot water passageway and said cold water passageway being in communication with said mixed water discharge passageway at the downstream end thereof;

water temperature control valve means interposed between said mixed water discharge passageway and said hot water passageway and said cold water passageway at the downstream ends thereof for controlling the amount of hot water flow from the hot water passageway into the mixed water discharge passageway and the amount of cold water flow from the cold water passageway into said mixed water discharge passageway;

said water temperature control valve means comprising a cylinder and a piston axially movably mounted in said cylinder wherein movement of said piston in said cylinder in a first axial direction increases the degree of communication between the hot water passageway and the mixed water discharge passageway thereby increasing the volume of hot water flowing into said mixed water discharge passageway and decreases or seals off communication between said cold water passageway and said mixed water discharge passageway thereby decreasing or shutting off the cold water flow into the mixed water discharge passageway, while movement of said piston in said cylinder in the opposite axial direction increases the degree of communication between the cold water passageway and the mixed water discharge passageway thereby increasing the volume of cold water flowing into said mixed water discharge passageway and decreases or seals off communication between said hot water passageway and said mixed water discharge passageway thereby decreasing or shutting off the hot water flow into the mixed water discharge passageway;

a thermostat element axially movably disposed within said mixed water discharge passageway operably connected to said piston to move said piston axially within said cylinder in response to the axial movement of said thermostat element within said mixed water discharge passageway, the thermostat element lying in the flow path of the mixed water and being arranged to move the piston relative to the cylinder in dependence upon the temperature of the mixed water passing through the mixed water discharge passageway.

2. A mixing valve as claimed in claim 1 wherein said thermostat element comprises a wax filled thermostat element.

3. A mixing valve as claimed in claim 1 wherein an adjustable abutment means is provided against which the thermostat element bears.

4. A mixing valve as claimed in claim 3 wherein said adjustable abutment means comprises a rod bearing at one end thereof against the thermostat element and connected at the other end thereof to vertically adjustable cam means.

5. A mixing valve as claimed in claim 4 wherein said cam means comprise a cam follower connected to said rod and an adjustable cam surface cooperating with said cam follower to adjust the axial position of said rod within said cartridge.

6. A mixing valve as claimed in claim 5 which further includes spring means biasing said thermostat element against said rod.

7. A mixing valve as defined in claim 1 wherein said valve means comprises a fixed valve plate including a first hot water inlet aperture, a first cold water inlet aperture, and a first mixed water outlet aperture, and a sliding valve plate including a second hot water inlet aperture, a second cold water inlet aperture, and a second mixed water outlet aperture, said sliding valve plate cooperating with said fixed valve plate to control the volume flow into the cartridge.

8. A mixing valve as claimed in claim 1 wherein said cartridge comprises an upper cartridge section connected to a lower cartridge section.

9. A mixing valve as claimed in claim 8 wherein said lower cartridge section comprises a nose piece comprised of a lower hemispherical portion including a hot water passageway, a cold water passageway and a mixed water discharge passageway extending axially therethrough, and a top cylindrical portion adapted to receive a fixed valve plate including a first hot water inlet aperture, a first cold water inlet aperture and a first mixed water outlet aperture, said first hot water inlet aperture of said fixed valve plate being in communication with said hot water passageway of said hemispherical portion, said first cold water inlet aperture of said fixed valve plate being in communication with said cold water passageway of said hemispherical portion, and said first mixed water outlet aperture of said fixed valve plate being in communication with said mixed water discharge passageway of said hemispherical portion.

10. A mixing valve as claimed in claim 9 wherein said upper cartridge section comprises a hollow cylindrical sleeve connected to said lower cartridge section, a hollow cylindrical housing rotatably disposed within said hollow cylindrical sleeve having an open bottom end and containing a valve plate fixedly mounted at the bottom end of said cylindrical housing, said valve plate containing a second hot water inlet aperture, a second cold water inlet aperture and a second mixed water aperture, said valve plate slidably rotatably cooperating with said fixed valve plate in said nose piece to control the volume flow into said hot water passageway and cold water passageway in said upper cartridge section, and an inner generally cylindrical hollow inner housing having an open top end and a smaller outer diameter than the inner diameter of said housing disposed within said cylindrical housing, the hollow interior of said inner housing defining said mixed water discharge passageway and the outer surface of said inner housing and the inner surface of said housing defining said hot water passageway and said cold water passageway.

11. The mixing valve as claimed in claim 10 wherein said cylinder is seated on the top end of said cylindrical housing.

12. A cartridge for a mixing valve comprising:
 a lower cartridge section comprising a generally hemispherical bottom portion and a generally cylindrical top portion, said bottom hemispherical portion having a hot water inlet means, cold water inlet means, and mixed water outlet means therein in communication with said cylindrical top portion;
 a first valve plate disposed in said cylindrical top portion having a first hot water inlet aperture, a first cold water inlet aperture, and a first mixed water outlet aperture therein, said first hot water inlet aperture being in communication with said hot water inlet means, said first cold water inlet aperture being in communication with said cold water inlet means, and said first mixed water outlet aperture being in communication with said mixed water outlet means;
 an upper cartridge section adapted to be coupled to said lower cartridge section comprising
 a tubular hollow sleeve having an open bottom end adapted to be coupled to said lower cartridge section;
 a cylindrical housing having a longitudinally extending cavity in the interior thereof and an open bottom and communicating with said cavity rotatably disposed in said tubular hollow sleeve;
 a second valve plate mounted on the open bottom end of said cylindrical housing having a second hot water inlet aperture, a second cold water inlet aperture, and a second mixed water outlet aperture rotatably cooperating with said first valve plate to control the volume of water flowing into the upper cartridge section;
 a generally cylindrical inner housing disposed in said longitudinally extending cavity in the interior of said cylindrical housing, said inner housing having an interior longitudinally extending mixing chamber, an open top end communicating with said mixing chamber, and a closed bottom end having a mixed water discharge outlet therein in communication at one end with said mixing chamber and at the other end with said second mixed water outlet aperture, said inner cylindrical housing further having a smaller outer diameter than the inner diameter of said cylindrical housing whereby a longitudinally extending hot water passageway and a longitudinally extending cold water passageway are defined by the outer surface of said inner cylindrical housing and the inner surface of said cylindrical housing;
 the top ends of said hot and cold water passageways in communication with said mixing chamber at the open top end of said cylindrical inner housing, and in communication with said second hot water inlet aperture and said second cold water inlet aperture, respectively, at their bottom ends;
 control valve means disposed on the top open end of said cylindrical inner housing and interposed between said hot and cold water passageways and said mixing chamber to control the amount of hot and cold water flowing into said mixing chamber;
 said control valve means comprising a cylinder fixedly mounted on the top open end of said cylindrical housing and a piston axially movably disposed in said cylinder; and
 a thermostat element axially movably disposed within said mixing chamber operably connected to said piston to move said piston axially within said cylinder in response to the axial movement of said thermostat element within said mixing chamber, the thermostat element being in contact with the mixed water and being arranged to move the piston within said cylinder in dependence upon the temperature of the mixed water passing through said mixing chamber and contacting said thermostat element.

13. A cartridge as claimed in claim 12 wherein said thermostat element comprises a wax filled thermostat element.

14. A cartridge as claimed in claim 12 which further includes means for adjustably limiting the upward axial travel of said thermostat element in said mixing chamber.

15. A cartridge as claimed in claim 14 wherein said means comprise adjustable abutment means against which the thermostat element bears.

16. A cartridge as claimed in claim 15 wherein said adjustable abutment means comprises a rod bearing at one end thereof against the thermostat element and connected at the other end thereof to adjustable cam means.

17. A cartridge as claimed in claim 16 wherein said cam means comprises a cam follower connected to said rod and an adjustable cam surface cooperating with said cam follower to adjust the axial position of said rod.

18. A cartridge as claimed in claim 17 which further includes spring means biasing said thermostat element against said rod.

19. A cartridge as claimed in claim 15 which further includes spring means biasing said thermostat element against said abutment means.

20. A cartridge for a mixing valve comprising:
 a lower cartridge section comprising a generally hemispherical portion having two inlet ports and an outlet port;
 first valve means for controlling the volumetric flow into said cartridge including an outlet aperture which is in communication with said outlet port;

an upper cartridge section downstream of and in communication with said first valve means comprising a housing having a longitudinally extending cavity and an open end, an inner housing disposed in said longitudinally extending cavity in the interior of said housing, said inner housing having an interior longitudinally extending mixing chamber, an open top end communicating with said mixing chamber, and a closed bottom end having a mixed water discharge outlet therein in communication with said mixing chamber, at least a portion of said inner cylindrical housing having a smaller outer diameter than the inner diameter of said housing whereby a longitudinally extending hot water passageway and a longitudinally extending cold water passageway are defined by the outer surface of said inner housing and the inner surface of said housing, the top ends of said hot and cold water passageways in communication with said mixing chamber at the open top end of said inner housing, thermostatic valve means disposed on the top open end of said inner housing and interposed between said hot and cold water passageways and said mixing chamber to control the amount of hot and cold water flowing into said mixing chamber, said thermostatic valve means comprising a cylinder mounted on the top open end of said cylindrical housing and a piston axially movably disposed in said cylinder, and a thermostatic element disposed within said mixing chamber operably engaged with said piston to move said piston axially within said cylinder in response to the temperature in said mixing chamber.

21. A cartridge as claimed in claim 20 wherein said first valve means comprise a first fixed valve disk containing a first hot water inlet aperture and a first cold water inlet aperture cooperating with a second movable valve disk containing a second hot water inlet aperture and a second cold water inlet aperture to control the total water flow therethrough.

22. A cartridge as claimed in claim 21 which further includes means for adjustably limiting the upward axial travel of said thermostat element in said mixing chamber.

23. A cartridge as claimed in claim 22 wherein said means comprise adjustable abutment means against which the thermostat element bears.

24. A cartridge as claimed in claim 23 wherein said adjustable abutment means comprises a rod bearing at one end thereof against the thermostat element and connected at the other end thereof to adjustable cam means.

25. A cartridge as claimed in claim 24 wherein said cam means comprises a cam follower connected to said rod and an adjustable cam surface cooperating with said cam follower to adjust the axial position of said rod.

26. A cartridge as claimed in claim 25 which further includes spring means biasing said thermostat element against said rod.

27. A cartridge as claimed in claim 26 which further includes spring means biasing said thermostat element against said abutment means.

* * * * *